United States Patent
Frodigh et al.

(10) Patent No.: US 6,466,797 B1
(45) Date of Patent: Oct. 15, 2002

(54) METHODS AND ARRANGEMENTS RELATING TO A RADIO COMMUNICATION SYSTEM

(75) Inventors: Magnus Frodigh; Magnus Almgren, both of Sollentuna; Christer Johansson, Solna; Mats Halvarsson, Luleå; Harald Kallin, Sollentuna, all of (SE)

(73) Assignee: Telefonaktiebolaget LM Ericsson (publ) (SE)

( * ) Notice: Subject to any disclaimer, the term of this patent is extended or adjusted under 35 U.S.C. 154(b) by 0 days.

(21) Appl. No.: 09/441,097

(22) Filed: Nov. 16, 1999

(30) Foreign Application Priority Data

Nov. 17, 1998 (SE) .............................................. 9803916

(51) Int. Cl.⁷ .............................. H04Q 7/20; H04B 7/00
(52) U.S. Cl. ...................... 455/456; 455/504; 455/446; 455/676; 455/430; 455/69; 455/450; 370/332
(58) Field of Search .......................... 455/456, 504–506, 455/436, 442, 449, 453, 440, 445, 443, 676, 522, 69, 70, 67.1, 423, 12.1, 13.1, 13.4, 422, 427, 429, 446, 430, 450–452; 370/328, 329, 332, 333, 331

(56) References Cited

U.S. PATENT DOCUMENTS

| | | | | |
|---|---|---|---|---|
| 5,710,758 A | * | 1/1998 | Soliman et al. | 455/67.6 X |
| 5,918,176 A | * | 6/1999 | Arrington, Jr. et al. | 455/456 X |
| 5,946,603 A | * | 8/1999 | Ibanez-Meier et al. | 455/13.1 |
| 6,144,858 A | * | 11/2000 | Masuda | 455/456 |
| 6,169,881 B1 | * | 1/2001 | Astrom et al. | 455/12.1 |

FOREIGN PATENT DOCUMENTS

| WO | WO 94/27398 | 11/1994 |
|---|---|---|
| WO | WO 98/01768 | 1/1998 |

* cited by examiner

*Primary Examiner*—Tracy Legree
(74) *Attorney, Agent, or Firm*—Jenkens & Gilchrist, a Professional Corporation

(57) ABSTRACT

In a mobile telecommunication system the transmission quality is dependent on a wide range of radio conditions. A method for extracting a useful estimation of the radio environment of a mobile station in communication in order to predict how the radio conditions will change in the near future for a considered mobile station in the near future. A measurement report is sent from the mobile station to the base station. The quality measure in the measurement report is filtered over the area by a smoothing filter (220), and then processed through an updating filter (230) resulting in a time varying map (240). Several maps are classified (260). Classified data are grouped (270) resulting in the final map, which is stored in a database (280). The final map may be used to enhance the performance of radio network algorithms.

47 Claims, 6 Drawing Sheets

METHODS AND ARRANGEMENTS RELATING TO A RADIO COMMUNICATION SYSTEM

FIELD OF INVENTION

The present invention relates to a method and devices for wireless communication with a mobile station.

DESCRIPTION OF RELATED ART

In a mobile telecommunication system the transmission quality is dependent on a wide range of radio conditions. The radio conditions vary with the distance from the base station, atmospheric conditions, the topography around the considered mobile station etc. As the radio conditions are rapidly varying for the considered mobile station, the transmission quality may sometimes deteriorate in such an extent that the connection is lost. On the other hand, when the radio conditions are good, the transmission quality may be oversized resulting in unnecessary costs. However, the problem associated with extracting a useful estimation of the radio environment of a mobile station in communication in order to predict how the radio conditions will change in the near future for a considered mobile station remains unsolved.

Having no information on the location of the mobile station in communication it is very hard to predict how the radio conditions will change in a near future for a considered mobile station. The radio network algorithms for a radio communication system are usually designed to try to follow the changes of the radio conditions and react upon the changes in order to suitably adapt electric and other characteristics when transmitting to a mobile station. However the radio environment of a mobile station is mostly changing very fast. For example, a small change in the position of a mobile station may result in a large change in received signal strength due to rapid fading. Therefore it is also mostly very difficult to accurately and rapidly enough follow the changing radio conditions. In order to improve the transmission from the base station data associated with the geographic position of the mobile station can be used. Thus, in GB-2271486 a communication system is disclosed, wherein a base station communicates with a number of mobile communication devices and is coupled to a central controller for relaying messages to the controller and for receiving and relaying control information from the controller. A number of mobile stations are provided with a GPS (Global position system) receiver in order to receive information from a GPS relating each mobile communication device to a geographic position (x, y, z). A transceiver transmits messages to the base station and receives control information from the base station. A transmitted message includes information relating to the geographic position (x, y, z) and the controller administers, through control of a base station, control of the communication system in response to geographic position information transmitted by the mobile communication devices. In the patent application GB-2271486 a method for dividing the coverage area into overlapping and non-overlapping areas and assigning different channels depending on the position of the mobile is disclosed. Signal strength decides the partitioning of the area not using any filtering of the position information. The deficiency is that said data are of insufficient quality as said data are registered for each measurement point.

WO-9801768 discloses a facility to make timing measurements between base stations and a mobile station in order to indicate the distance of the mobile station from at least one of the base stations. The distance indications in these systems will often be processed to produce an ambiguous indication of the position of the mobile station, and WO-9810768 deals with resolving position ambiguities using several techniques such as signal averaging, forming a signal contour map, making Doppler measurements, obtaining traffic flow information, and processing historical position data. In a second aspect the combination of two or more of the ambiguity resolution techniques can be achieved by multisensor fusion, probabilistic approaches, nearest neighbour and Kalman filter techniques that allow the integration of multiple sources of information over time. The preferred technique for integrating and evaluating the sequence of timing measurements is using the Kalman filter combined with probabilistic techniques to weight each of the measured events. The most likely of the sequences is chosen as indicating the true position of the mobile station. A spinoff of the technique is the ability to automatically derive signal strength contour maps. These maps can be used to improve the hand-off performance of the cellular network and for the purposes of network planning and design. The signal strength maps are continually updated, and it is hence possible to have them compensated for seasonal changes, such as tree foliage, by changing multipath and signal occlusion and this enables an automatic adaptation to any changes in the mobile network configuration. A single signal strength measurement may be susceptible to various fading influences, and a method using a single signal strength may use various signal averaging techniques to obtain a signal strength measure more indicative of the location of the mobile station. A signal strength contour map may be generated, and this map may also be used to resolve ambiguities. A system in which the method described in WO-9801768 is carried out may continuously integrate information from many sources to keep the information up to date and to compensate for the time-of-day, day to day and seasonal variations. The deficiency with the solution described in WO-9801768 is that it only deals with finding the exact location of the mobile station.

WO-9427398 discloses a method to determine the location of a mobile station using GPS, LORAN (LOcation Radio Based Navigation), triangulation or other position determining systems. Information on the geographic location, shape and size of each cell is stored in a look-up table. The position of the mobile station is constantly updated, and call management decisions, such as hand-off, can be made based on the location of the mobile station. The MTSO (Mobile Telecommunication Switching Office) has a look-up table in its data storage facilities which is used for comparing positional data from the mobile stations to data associated with the cell site coverage areas. Based on a look-up in this table, the MTSO can select the cell site, which is the most appropriate to a call. The deficiency of the disclosure of the application WO-9427398 is that the data in the database is not regularly updated.

JP-06350516 discloses a method for determining positions of mobile stations using the GPS. A receiver receives electro-magnetic waves from a measuring object of the mobile station. A statistical processor processes the amplitude of the electromagnetic waves. A controller stores the statistically processed data, based on the position information of the navigation system controller. The method according to JP-06350516 is used to determine base stations in hand-off. The data are only statically processed, and then time is not considered, which is not satisfactory in order to provide an accurate description of the radio conditions of an area around the mobile station.

SUMMARY OF THE INVENTION

The methods disclosed in the cited documents GB-2271486, GB-2313742, WO-9801768, WO-9427398, JP-06350516 deal with the position of the mobile station. None of these cited documents deals with processing incoming data related to mobile stations in a radio telecommunication system in such a way that it is possible to extract useful information concerning the radio conditions around a considered mobile station.

The deficiency is that the information is not filtered using coefficients considering area and time, and therefore the information can not be used in algorithms, which may improve the performance of the network. The term"filter" is herein defined as the mathematical process by means of which the data concerning the mobile station, its position, signal quality, and other information, are processed over area and time. The term"filtering" is herein defined as using the filter by means of which the incoming data are processed. The term"smoothing filter" is herein defined as a filter, which smoothes data concerning the radio conditions, i.e. decreasing variance of data. The term"active set" is herein defined as the set of base stations, which communicate with a considered mobile station.

One object of the present invention is thus to process the information concerning the location of the mobile station by means of a filter in order to create a map of signal quality versus location. This map may be used to more accurately predict radio conditions in each zone and hence change the performance of the radio network algorithms.

A further object of the invention is to determine if a base station belongs to the active set, e.g. for soft hand-off in a CDMA system or macro diversity in general.

Another object of the invention is to force a mobile station to make hand-off earlier than scheduled due to some expected change, for example before entering a tunnel, using said processed information.

The present invention is intended to solve the problem associated with controlling the transmission in communication with a mobile station using information on the geographic position and the radio environment of the mobile station. It is made by processing the information, e.g. by means of a filter in order to smooth information, which is generally measured for specific, localised geographic positions, not for an area. This information is processed to be valid for a region according to a probability function. Then slowly varying position based information of the radio conditions is obtained which can then be used to enhance the performance of the existing radio network algorithms.

The present invention thus provides methods for processing radio condition information related to the location of the mobile station in order to improve existing radio network algorithms, e.g. algorithms for hand-off, cell selection or creating dynamic cell sizes. The initial choice of communication channel and output power could also be improved by this location dependent information.

An advantage of the invention is that it enables, using said processed information, the choice of a channel with a minimum of interference.

An other advantage of the invention is that it enables, using said processed information, the choice of power setting, in order to optimise the use of energy, i.e. to use appropriate amount of energy.

A further advantage of the invention is that it enables, using said processed information, the choice of an appropriate base station, e.g. the base station in a hierarchical cell structure providing the best quality versus power consumption.

The invention creates opportunities to enhance the performance of existing radio network algorithms by predicting the radio conditions within a specified area. It also reduces the need for highly accurate position measurements when applying the position related information in network functions since the filtering over the area smoothes the measurements made on several points in the database.

The invention also creates possibilities to decrease the size and identify the areas where certain events, such as dropped calls or failed hand-offs, often occur. This could be used to make it possible to start countermeasures against poor planning or configuration of the communication system, e.g. size and location of the cells.

The system, method and apparatus according to the invention is characterised by the features set forth in the characterising clause of the independent claims 1, 20 and 40 and their associated dependent claims.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The invention will now be described in more detail by way of example with reference to preferred non-limiting embodiments thereof and also with reference to the accompanying drawings; wherein.

DESCRIPTION OF PREFERRED EMBODIMENTS

Figure 1:
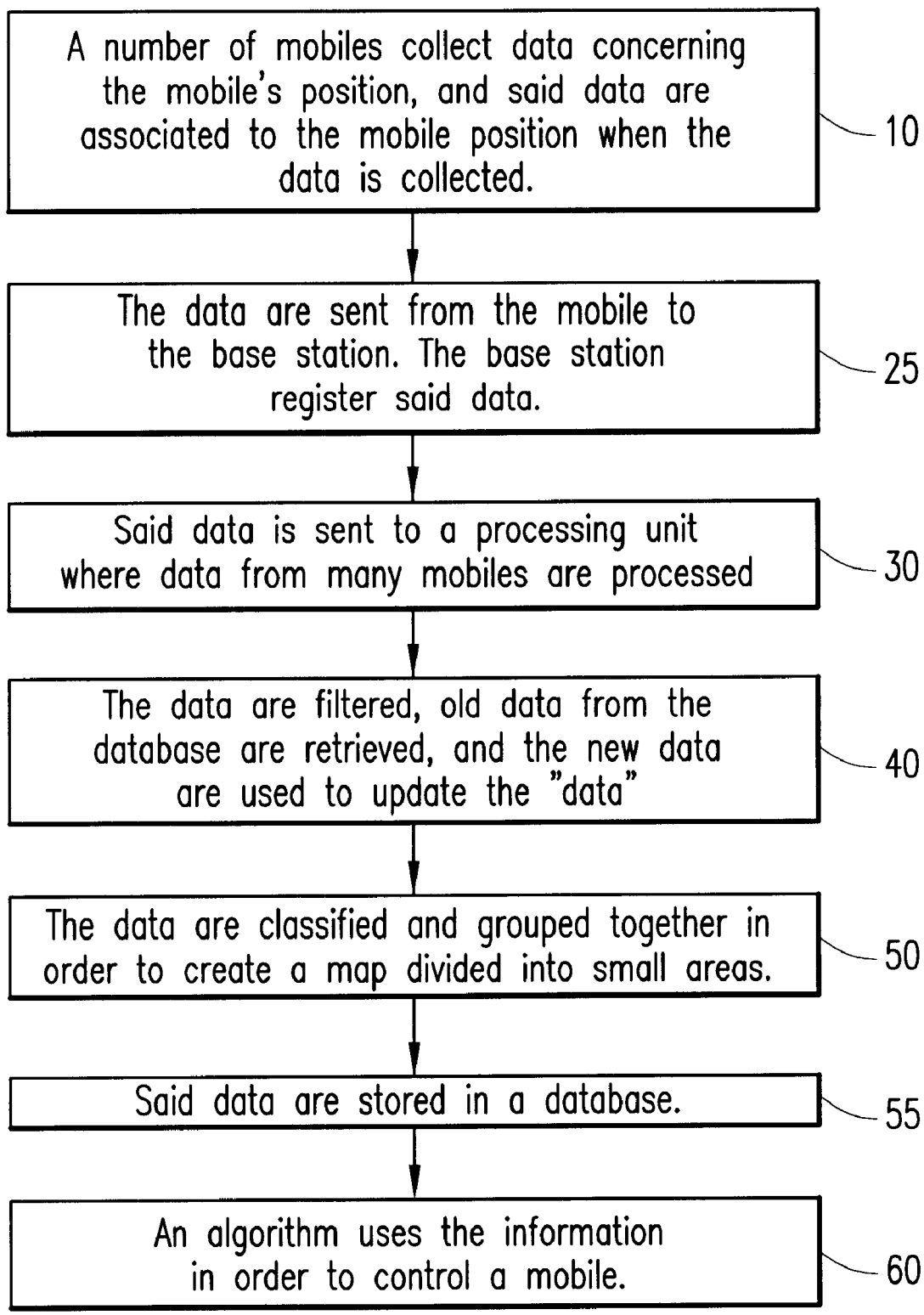
FIG. 1 is a flowchart illustration of the operational steps of a system according to the invention.

FIG. 1 shows a flow chart illustrating the functional steps of one embodiment of the invention.

In a first block 10, data concerning the position of a considered mobile station are collected, for example by means of triangulation or GPS, events such as lost connection or hand-off failure at the registered position and signal quality, signal strength and the time when said events occurred. In the case of a lost connection, the information concerning the position of the mobile station may be collected at the time when the connection is lost. In the next block 25, said data are sent from the mobile station to a base station, and the base station then measures the signal quality and the signal strength when receiving the data and relates the measured information to the position reported in the received data. Also, in this block 25, events such as lost connections are recorded and also this information is related to the reported position or the last known position of the considered mobile station. Thereupon, in a block 30, the data now collected relating to the considered mobile station are provided to a processing unit where data from many mobile stations are processed. Next, in a block 40, the data are filtered in the processing unit in such a way that the information now collected concerning the considered mobile station, including its position, is analysed with respect to earlier collected and processed data concerning an area of a predetermined size on the map around the mobile station, in order to create logical zones, the zones being determined in such a way that the radio conditions in each zone are similar or can at least be considered to be substantially constant. In the next block 50, the now collected data are classified according to predefined criteria, such as an interval for signal strength or a threshold value for the bit rate, and grouped together in order to create a map divided into said logical zones, where each logical zone is supposed to be a part of, and often much smaller than, a cell. Each logical zone has a classification, which relates to the radio conditions in said zone. In block 55, these data are stored in a database, which is updated from time to time, depending on the system. As the number of measurements related to every position increases, the knowledge of the radio condition of the respective position increases. At peak hours, when the system is very busy and in high demand of optimisation, the database may be frequently updated. At night, when the load is low, predefined parameters might be used. Also, old maps could be saved for later use. For example, it is possible to reuse, in e.g. December, the winter map from the previous year. The blocks 50 and 55 may be processed in the reverse order. Thereafter the processed data are again processed, together with new data in order to improve the quality of the map, see block 40. In block 60, an algorithm uses the information in the database in order to control the admission of a mobile station to the network, the choice of an adequate base station, the choice of an adequate channel, and the required amount of power. As the "ground speed" of the mobile station is limited, i.e. the mobile station is not supposed to travel faster than a car, the method as described herein offers a possibility to predict the radio conditions in the immediate future. The information provided in the database is used for each call.

Figure 2A:
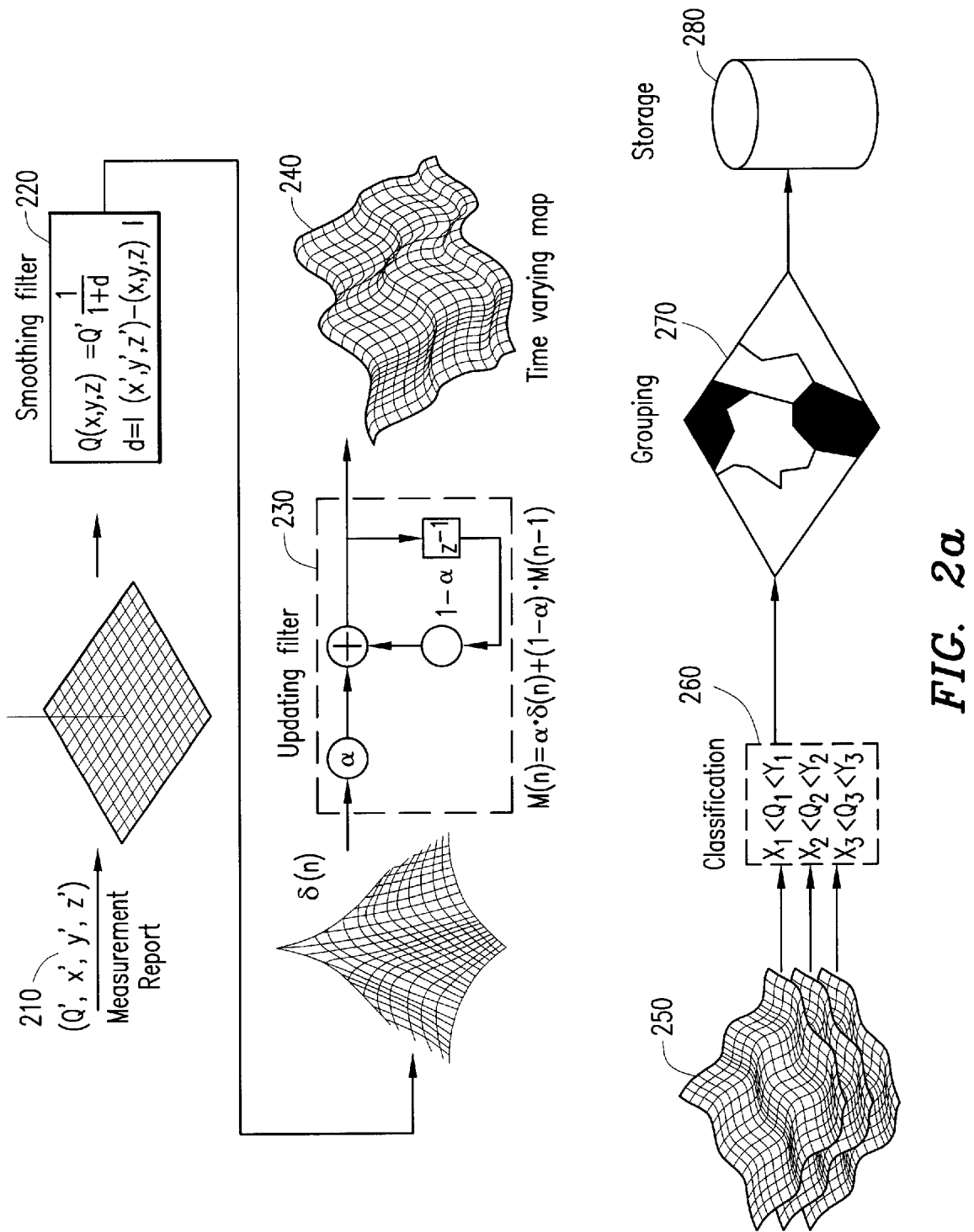
FIGS. 2a, 2b illustrate components and processing steps of a system for communication with a mobile station.

FIG. 2a shows an example of how the filtering and the storing of the data are performed. At 210, the measurement report is sent from the mobile station to the base station, wherein the measurement report contains at least one quality measure and information of the position. The quality measure is filtered over the area by a smoothing filter in step 220. In this example, a step 220 for processing through a filter having isometric dependency is used where, $$Q(x, y, z) = Q' \frac{1}{1+d} \text{ and}$$

where Q is an estimated value,
Q' is an input value of a quality measure, e.g. signal strength,
d is the distance from the point (x', y', z') where the input value Q' is measured and the running coordinates (x, y, z),
x, y, z are the running coordinates of a point in the area,
x', y', z' are the coordinates of the point for which the input value Q' is measured.

The filter does not have to be isometric i.e. to have an equal dependency in all directions, since perhaps the resolution in the z- direction needs to be higher than for the x- and y- directions. The map, or the new function Q(x,y,z) that we obtain from the smoothing filter at the point of measurement n at the time t, is called δ(t) and is used to update the old quality map M(t-1). Said quality map M(t-1) may be stored in a buffer coupled to the updating filter. The updating filter in step 230 can be an IIR filter (Infinite Impulse Response) or a FIR filter (Finite Impulse Response), but in this example it is an IIR filter of the first order where $$M(t) = \alpha \cdot \delta(t) + (1-\alpha) \cdot M(t-1),$$

where α is filter coefficient.

In step 240, a time varying map is kept for each quality measure that is being used in the classifying step 260. These maps are classified in step 260 according to some criteria, e.g., that the signal strength is between −95 dBm and −105 dBm or the BER (Bit Error Rate) is larger than $10^{-6}$. Identifying the areas where a combination of these classifications is considered to be constant is called grouping the data, which is performed in step 270. The final map, that results from the grouping step 270, is stored, in step 280, in a database, for later use.

Figure 2B:
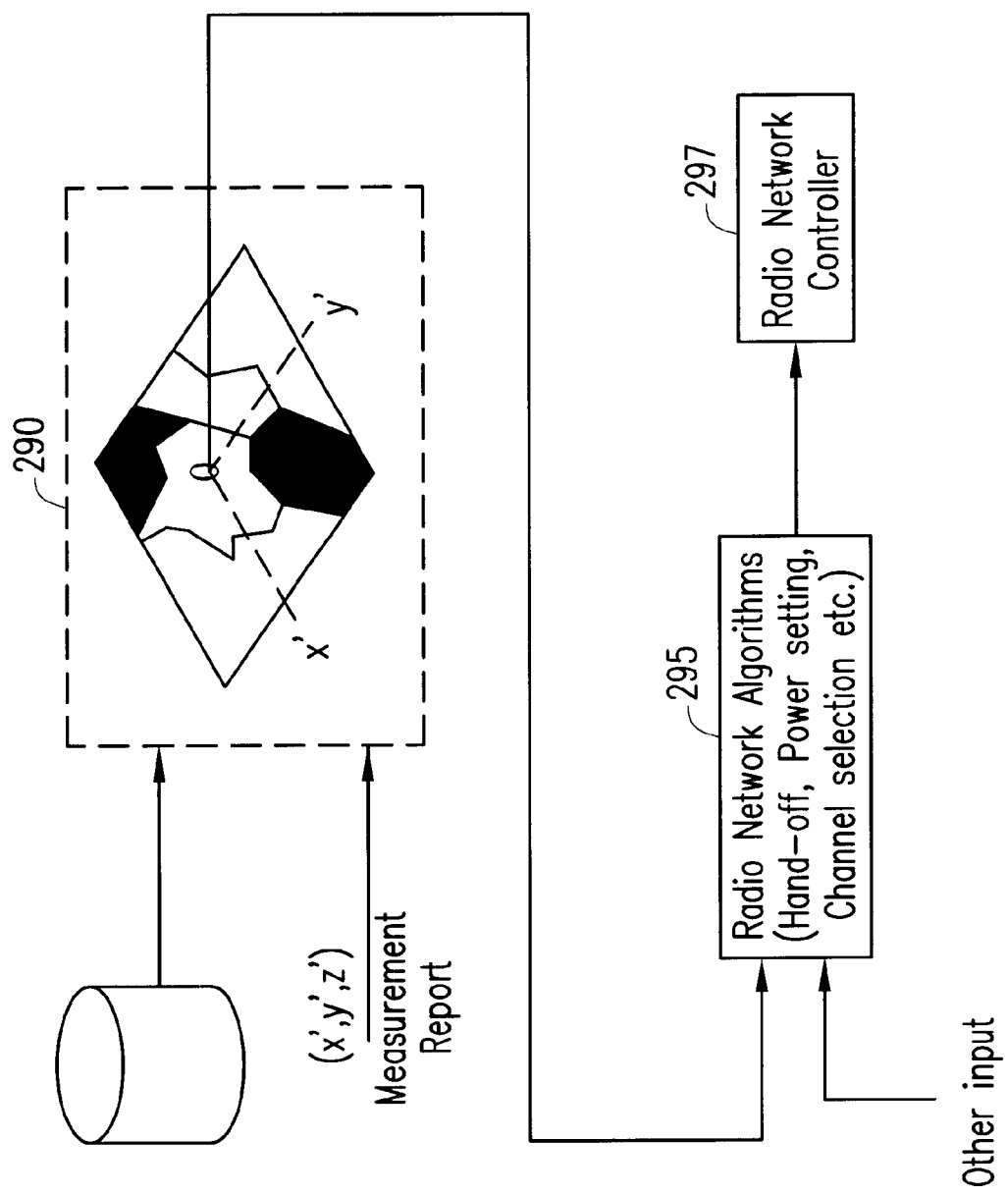

The usage of the database is shown in the lowest part of FIG. 2b. In step 290, a measurement report arrives to the system and the position information is extracted. The position information is used to, from the map in the database, extract information of the radio conditions in the vicinity of the considered mobile station. The information of the radio conditions is then used in step 295 to enhance the performance of the radio network algorithms, such as hand-off, power setting or channel selection. The output from the radio network algorithms are then used in step 297 by the radio network controller to control the system.

In another embodiment, the updated value from step 230 may be buffered in a database, and several maps may be buffered for each Q-value. However, this embodiment requires another algorithm for extracting the information of the radio conditions to be used in the radio network algorithms.

Figure 3:
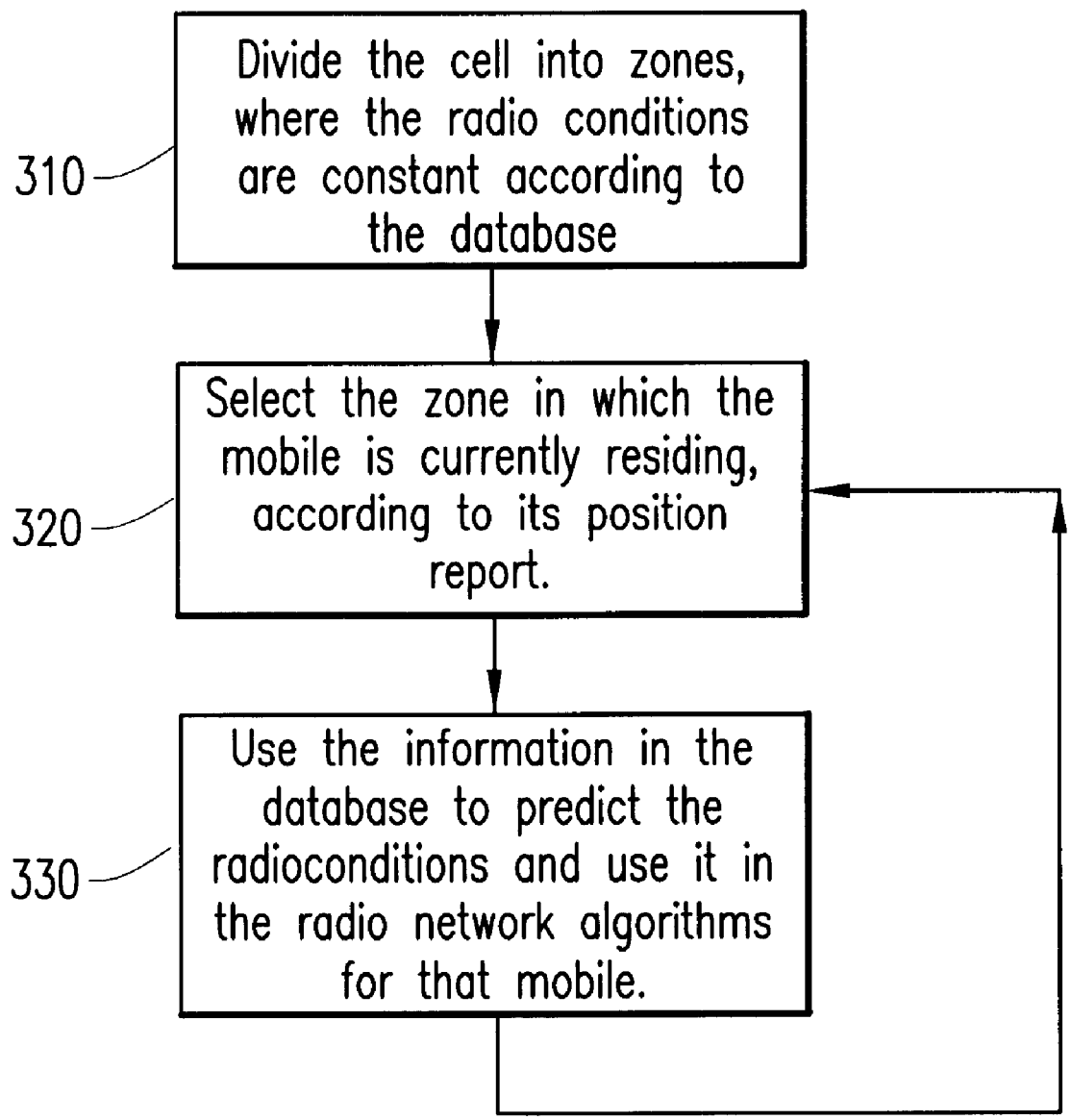
FIG. 3 is a flow chart of the steps used in handling a database according to the invention.

FIG. 3 depicts a flowchart illustrating an example of a method for the usage of the database.

In block 310, the area covered by this database is divided into smaller parts of the area, called zones, where the radio conditions in some term(s) are considered to be similar or can at least be considered to be substantially constant. In block 320, the zone in which the mobile station is situated is selected, according to the position report. In block 330, within each of these zones, the radio conditions can be predicted more accurately and hence the performance of the radio network algorithms can be enhanced, these algorithms can for example be:

- to determine if a base station belongs to the active set, e.g. for soft hand-off in a CDMA system (Code Division Multiple Access), or macro diversity in general,
- to force a mobile station to make hand-off earlier than scheduled due to some expected change, for example before entering a tunnel,
- to choose channel depending on in which zone the mobile station is located,
- to choose power setting, in order to optimise the use of energy, e.g. to use appropriate amount of energy,
- to choose an appropriate base station, e.g. the base station in a hierarchical cell structure providing the best quality versus power consumption,
- to use said processed information to provide dynamic cell size.

Figure 4:
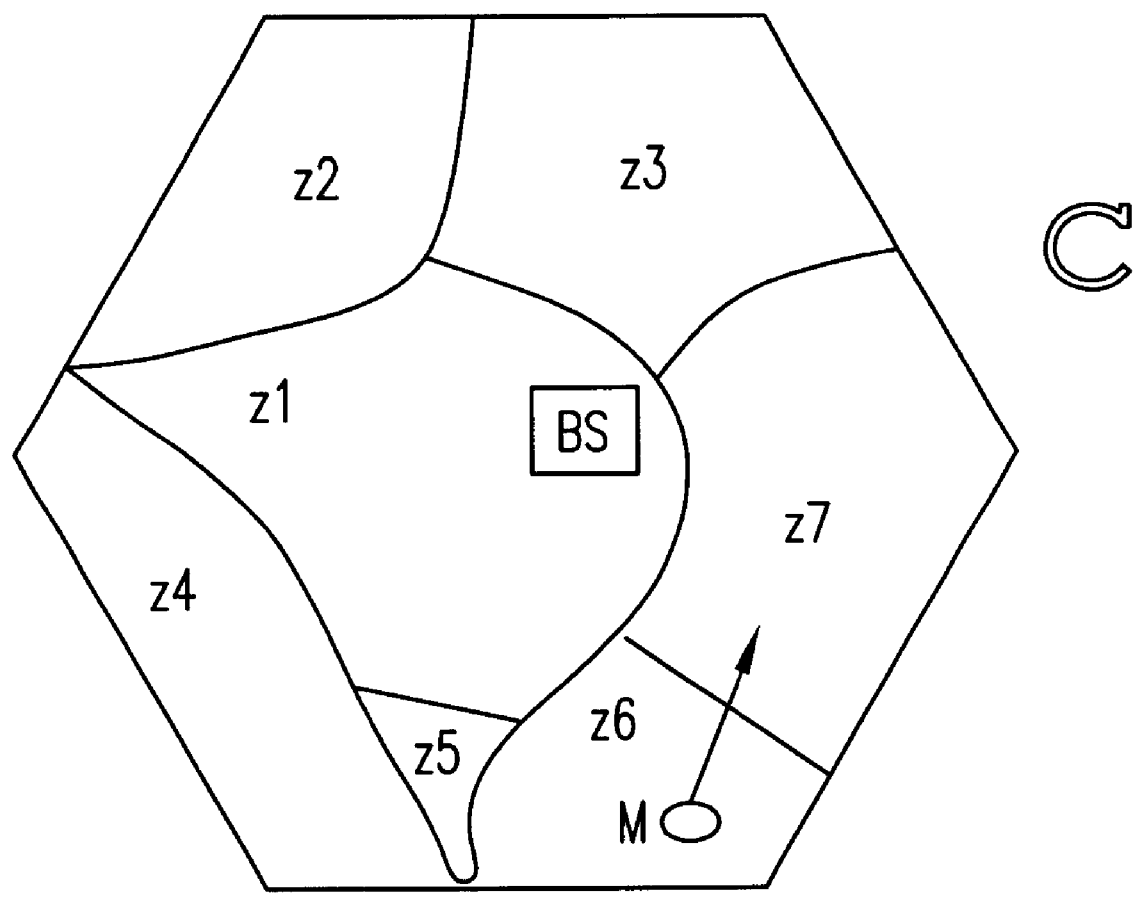
FIG. 4 shows another embodiment of the invention.

FIG. 4 depicts a mobile station M in a cell C under control of a base station BS. The cell C is divided into a number of zones, z1–z7, where at least one radio condition is considered to be similar or can at least be considered to be substantially constant (e.g. signal strength on the uplink or power requirement on the down link or wherein a predetermined choice of channel is preferred) from a mobile station in a zone to the base station BS. For example, zone z1 provides the best signal quality as it is situated next to the base station BS, and the signal quality might be quite bad in zone z3 as a hill is situated between the base station BS and zone z3. The base station observes that the mobile station is about to leave a zone z6, which requires a certain radio condition (e.g. a relatively high power on the down link), and enter a zone z7, which require another radio condition (e.g. a relatively low power on the down link). The base station BS can thus adapt the transmission on the down link (and e.g. save energy) or tune to a more adequate channel.

Figure 5:
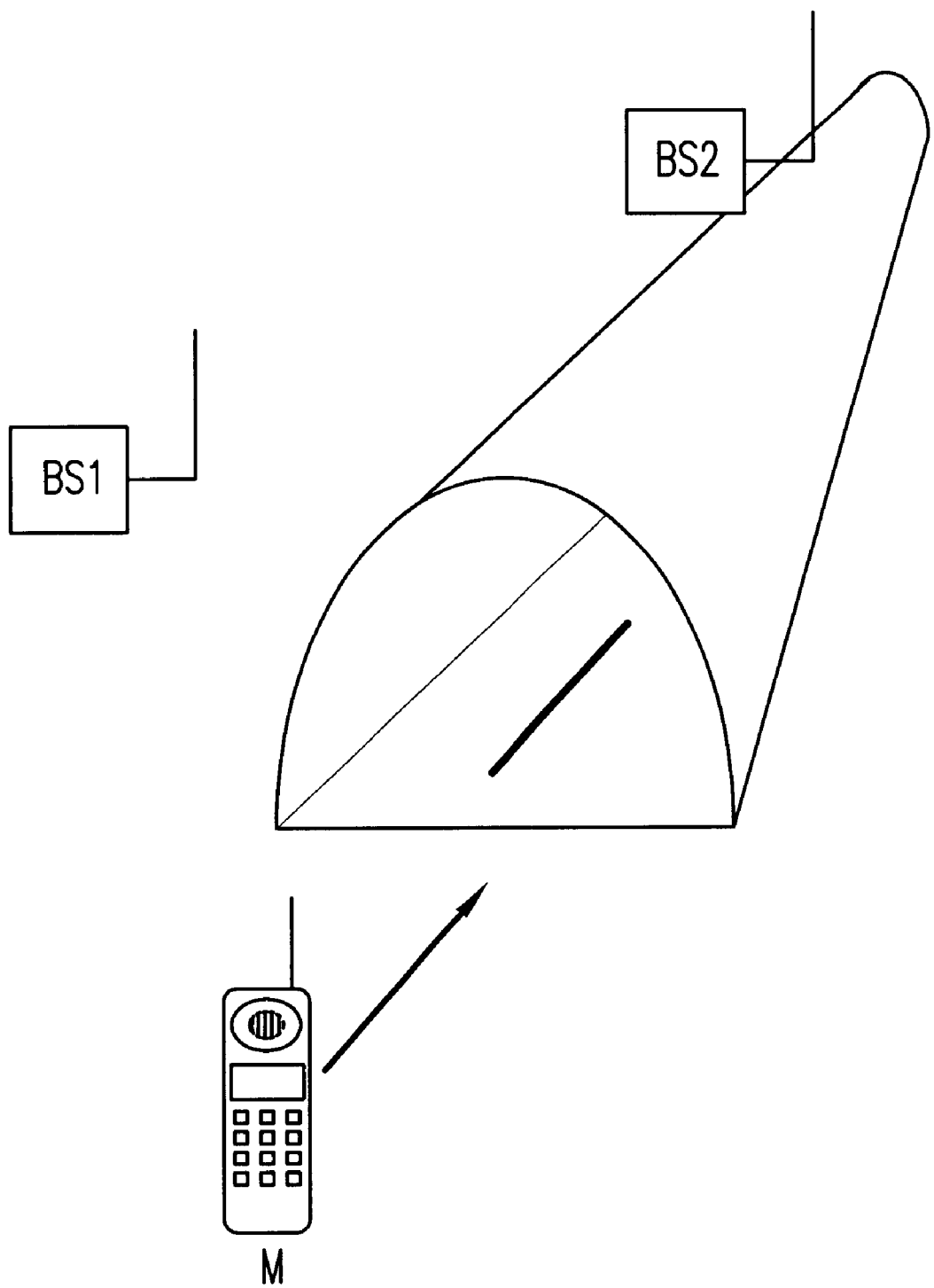
FIG. 5 shows yet another embodiment of the invention.

FIG. 5 depicts a mobile station M travelling in the direction of a tunnel. The mobile station M is under control of a base station BS1. BS1 does not reach the tunnel. A base station BS2 controls the area in the tunnel. The database informs BS1 that the mobile station M1 soon will enter the tunnel and thus loose contact with BS1. BS1 performs a hand-off in advance to BS2. Thus the mobile station M1 can continue to communicate.

The invention being thus described, it will be obvious that the same may be varied in many ways. Such variations are not to be regarded as a departure from the scope of the invention, and all such modifications as would be obvious to one skilled in the art are intended to be included within the scope of the following claims.

What is claimed is:

1. A radio telecommunication system comprising at least one mobile station, a database and at least one base station, said radio telecommunication system comprising:

position determining means for determining a position of the mobile station;

measuring means for measuring radio conditions in communications between the base station and the mobile station;

processing means connected to the position determining means and the measuring means for mathematically processing the measured radio conditions and the determined position of the mobile station, and further analyzing data of radio conditions and position information with respect to earlier processed and stored data concerning radio conditions related to positions of a mobile station in an area around the determined position of the mobile station, said processing means analyzing said data to classify and group said data to create a map divided into zones, each zone having an associated classification indicative of the radio conditions in the zone, so that the radio conditions are substantially uniform in each zone;

storing means connected to the processing means for storing the processed data in the database; and transmitting means, coupled to the at least one base station, being arranged to control transmission to the mobile station in accordance with data stored in the database.

2. The system according to claim 1, wherein the at least one base station comprises means for collecting information on the uplink and for relating said information to the position of the mobile station.

3. The system according to claim 1, further comprising means for collecting data and positional information at a time when communication with the mobile terminal is lost.

4. The system according to claim 1, further comprising means for performing an algorithm which uses said processed data to change the performance of the radio telecommunication system.

5. The system according to claim 1, wherein said processing means further comprises smoothing means for smoothing processed data over the area and weighting said information with earlier collected and processed data.

6. The system according to claim 1, wherein said processing means further includes an IIR filter.

7. The system according to claim 1, wherein said processing means further includes an IIR filter represented by M(t) of the first order where M(t)=α·δ(t)+(1-α)·M(t−1), where M is the processing in each point of the map, varying with the time, t is the time, and δ(t) is a measured value, which is processed over the area at the time t.

8. The system according to claim 1, wherein said processing means further includes an FIR-filter.

9. The system according to claim 1, wherein said processing means further includes a filter having isometric dependency, where, $$Q(x, y, z) = Q' \frac{1}{1+d},$$

and d=|(x,y,z)−(x',y',z')|, where Q is an estimated value,

Q' is an input value of a quality measure, d is a distance from a point (x', y', z') where the input value Q' is measured, x, y, z are running coordinates of a point in the area, and x', y', z' are coordinates of the point for which the input value Q' is measured.

10. The system according to claim 1, further comprising means for using the processed information in an algorithm to determine if a base station belongs to an active set.

11. The system according to claim 10, wherein the active set is used for performing soft hand-off in a CDMA system.

12. The system according to claim 10, wherein the active set is used for performing macro diversity.

13. The system according to claim 1, further comprising means for using the processed information in an algorithm to force a mobile station to hand-off earlier than scheduled due to some expected change.

14. The system according to claim 1, further comprising means for using the processed information in an algorithm to choose a channel depending on a zone in which the mobile station is located.

15. The system according to claim 1, further comprising means for using the processed information in an algorithm to choose power setting.

16. The system according to claim 1, further comprising means for using the processed information in an algorithm to choose an appropriate base station.

17. The system according to claim 1, further comprising means for using the processed information in an algorithm to determine size and location of cells.

18. The system according to claim 1, further comprising means for using the processed information in an algorithm to assist in placement of new base stations.

19. A method for filtering data, collected from connections in a radio telecommunication system, which includes a number of mobile stations and at least one base station, wherein radio conditions are measured and the measured radio conditions are related to a current reported position of a mobile station, said method further comprising the steps of:

processing incoming data by a filter in such a way that the information related to a mobile station and its position is analyzed with respect to earlier collected and processed data concerning an area of a predetermined size around the mobile station;

classifying and grouping said data to create a map divided into zones, to give each zone a classification, which indicates the radio conditions in the zone, so that the radio conditions are substantially uniform in each zone; and storing the classified data in a database.

20. A method according to claim 19, wherein the base stations collect information on the uplink and said collected information is related to the position of the mobile station.

21. A method according to claim 20, wherein the collected information related to the position of the mobile station is obtained through triangulation or GPS.

22. A method according to claim 19, wherein the data and the information concerning the position of the mobile station are collected at the time when the connection with the mobile station is lost.

23. A method according to claim 19, further comprising the step of using said classified data in an algorithm to change the performance of the radio telecommunication system.

24. A method according to claim 19, wherein said processing step further includes smoothing the information over the area and weighting the smoothed information with the earlier collected and processed data.

25. A method according to claim 19, wherein the filtered information is used in an algorithm to determine if a base station belongs to an active set.

26. A method according to claim 25, wherein the active set is used for performing soft hand-off in a CDMA system.

27. A method according to claim 25, wherein the active set is used for performing macro diversity.

28. A method according to claim 19, wherein the filtered information is used in an algorithm to force a mobile station to hand-off earlier than scheduled due to some expected change.

29. A method according to claim 19, wherein the filtered information is used in an algorithm to choose a channel depending on the zone in which the mobile station is located.

30. A method according to claim 19, wherein the filtered information is used in an algorithm to choose a power setting.

31. A method according to claim 19, wherein the filtered information is used in an algorithm to choose an appropriate base station.

32. A method according to claim 19, wherein the filtered information is used in an algorithm to provide a dynamic cell size.

33. A method according to claim 19, wherein the filtered information is used in an algorithm to assist in the placement of new base stations.

34. Apparatus for filtering data, collected from connections in a radio telecommunication system including a number of mobile stations and at least one base station, said apparatus comprising:

means for processing incoming data by a filter in such a way that information related to a mobile station and its position is analyzed with respect to earlier collected data concerning an area of a predetermined size around the mobile station;

means for classifying and grouping said data together to create a map divided into zones, to give each zone a classification, which indicates radio conditions in the zone, wherein the radio conditions are substantially uniform in each zone; and means for storing said classified data in a database.

35. Apparatus according to claim 34, wherein the base stations comprise means for collecting information on the uplink and relating said information to the position of the mobile station.

36. Apparatus according to claim 34, wherein said data and positional information are collected at a time when the connection with the mobile station is lost.

37. Apparatus according to claim 34, further comprising means for performing an algorithm which uses said classified data to change the performance of the radio telecommunication system.

38. Apparatus according to claim 37, wherein said processing means further comprising smoothing means which in the processing step smoothes information over the area and then weights said information with earlier collected and processed data.

39. Apparatus according to claim 34, further comprising means for using the filtered information in an algorithm to determine if a base station belongs to an active set.

40. Apparatus according to claim 39, wherein the active set is used for soft hand-off in a CDMA system.

41. Apparatus according to claim 39, wherein the active set is used for performing macro diversity.

42. Apparatus according to claim 34, further comprising means for using the filtered information in an algorithm to force a mobile station to hand-off earlier than scheduled due to some expected change.

43. Apparatus according to claim 34, further comprising means for using the filtered information in an algorithm to choose a channel depending on the zone in which the mobile station is located.

44. Apparatus according to claim 34, further comprising means for using the filtered information in an algorithm to choose a power setting.

45. Apparatus according to claim 34, further comprising means for using the filtered information in an algorithm to choose an appropriate base station.

46. Apparatus according to claim 34, further comprising means for using the filtered information in an algorithm to determine size and location of the cells.

47. Apparatus according to claim 34, further comprising means for using the filtered information in an algorithm to assist in the placement of new base stations.

* * * * *

UNITED STATES PATENT AND TRADEMARK OFFICE
CERTIFICATE OF CORRECTION

PATENT NO. : 6,466,797 B1
DATED : October 15, 2002
INVENTOR(S) : Magnus Frodigh et al.

It is certified that error appears in the above-identified patent and that said Letters Patent is hereby corrected as shown below:

<u>Column 5,</u>
Line 45, Replace "$Q(x,y,z)=Q' \dfrac{1}{1+d}$ and"

With $--Q(x,y,z)=Q' \dfrac{1}{1+d}$ and
$d=|(x,y,z)-(x',y',z')|,--$

Signed and Sealed this

First Day of April, 2003

JAMES E. ROGAN
*Director of the United States Patent and Trademark Office*